(12) United States Patent
Mitani

(10) Patent No.: US 12,371,179 B2
(45) Date of Patent: Jul. 29, 2025

(54) ELECTRIC POWER SYSTEM AND MOVING OBJECT

(71) Applicant: HONDA MOTOR CO., LTD., Tokyo (JP)

(72) Inventor: Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/610,407

(22) Filed: Mar. 20, 2024

(65) Prior Publication Data
US 2024/0317414 A1  Sep. 26, 2024

(30) Foreign Application Priority Data
Mar. 24, 2023 (JP) ................. 2023-047970

(51) Int. Cl.
*B64D 27/35* (2024.01)
*B64D 27/24* (2024.01)

(52) U.S. Cl.
CPC .................... *B64D 27/35* (2024.01)

(58) Field of Classification Search
None
See application file for complete search history.

(56) References Cited

U.S. PATENT DOCUMENTS

| 2020/0115045 | A1* | 4/2020 | Mermoz | B64D 35/024 |
| 2024/0116639 | A1* | 4/2024 | Graves | B64D 27/31 |
| 2024/0116641 | A1* | 4/2024 | Tepe | H02K 7/08 |

FOREIGN PATENT DOCUMENTS

JP  4958925 B2  6/2012

* cited by examiner

*Primary Examiner* — Jared Fureman
*Assistant Examiner* — Aqeel H Bukhari
(74) *Attorney, Agent, or Firm* — Rankin, Hill & Clark LLP

(57) ABSTRACT

An electric power system of a moving object includes a first polyphase rotating electric machine, a second polyphase rotating electric machine, a first polyphase terminal unit, a second polyphase terminal unit, a first polyphase cable, and a second polyphase cable. Each of the first and second polyphase terminal units includes a first phase terminal, a second phase terminal, and a third phase terminal. The first distance is smaller than the second distance that is smaller than the third distance. The fourth distance is smaller than the fifth distance that is smaller than the sixth distance.

7 Claims, 9 Drawing Sheets

ELECTRIC POWER SYSTEM AND MOVING OBJECT

CROSS-REFERENCE TO RELATED APPLICATIONS

This application is based upon and claims the benefit of priority from Japanese Patent Application No. 2023-047970 filed on Mar. 24, 2023, the contents of which are incorporated herein by reference.

BACKGROUND OF THE INVENTION

Field of the Invention

The present invention relates to an electric power system and a moving object.

Description of the Related Art

In recent years, research and development have been conducted on electric power systems that contribute to energy efficiency in order to ensure that more people have access to affordable, reliable, sustainable and modern energy.

For example, US 2020/0115045 A1 discloses an aircraft. The aircraft obtains a propulsion force by rotors driven by electric power generated by a generator.

SUMMARY OF THE INVENTION

US 2020/0115045 A1 does not specifically describe the layout of the components including cables. To provide an electric power system and a moving object capable of performing wiring suitably while suppressing cost.

An object of the present invention is to solve the above-described problems.

A first aspect of the present invention is an electric power system including: a rotating electric machine unit including a first polyphase rotating electric machine and a second polyphase rotating electric machine; a pair of a first polyphase terminal unit and a second polyphase terminal unit disposed on both sides of a region positioned in a first direction of the rotating electric machine unit so as to be spaced from each other in a second direction intersecting the first direction; a first polyphase cable connecting the first polyphase terminal unit and the first polyphase rotating electric machine; and a second polyphase cable connecting the second polyphase terminal unit and the second polyphase rotating electric machine, wherein each of the first polyphase terminal unit and the second polyphase terminal unit includes a first phase terminal, a second phase terminal and a third phase terminal arranged along the first direction, a first distance from the first phase terminal of the first polyphase terminal unit to the first polyphase rotating electric machine is smaller than a second distance from the second phase terminal of the first polyphase terminal unit to the first polyphase rotating electric machine, the second distance is smaller than a third distance from the third phase terminal of the first polyphase terminal unit to the first polyphase rotating electric machine, a fourth distance from the third phase terminal of the second polyphase terminal unit to the second polyphase rotating electric machine is smaller than a fifth distance from the second phase terminal of the second polyphase terminal unit to the second polyphase rotating electric machine, and the fifth distance is smaller than a sixth distance from the first phase terminal of the second polyphase terminal unit to the second polyphase rotating electric machine.

A second aspect of the present invention is an electric power system including: a rotating electric machine unit including a first rotating electric machine and a second rotating electric machine; a pair of a first terminal unit and a second terminal unit disposed on both sides of a region positioned in a first direction relative to the rotating electric machine unit so as to be spaced from each other in a second direction intersecting the first direction; a first cable connecting the first terminal unit and the first rotating electric machine; and a second cable connecting the second terminal unit and the second rotating electric machine, wherein each of the first terminal unit and the second terminal unit includes a grounding terminal and an ungrounded terminal arranged along the first direction, a distance from the grounding terminal of the first terminal unit to the first rotating electric machine is smaller than a distance from the ungrounded terminal of the first terminal unit to the first rotating electric machine, and a distance from the ungrounded terminal of the second terminal unit to the second rotating electric machine is smaller than a distance from the grounding terminal of the second terminal unit to the second rotating electric machine.

A third aspect of the present invention is a moving object including the above-described electric power system.

According to the present invention, wiring can be performed suitably while suppressing the cost.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
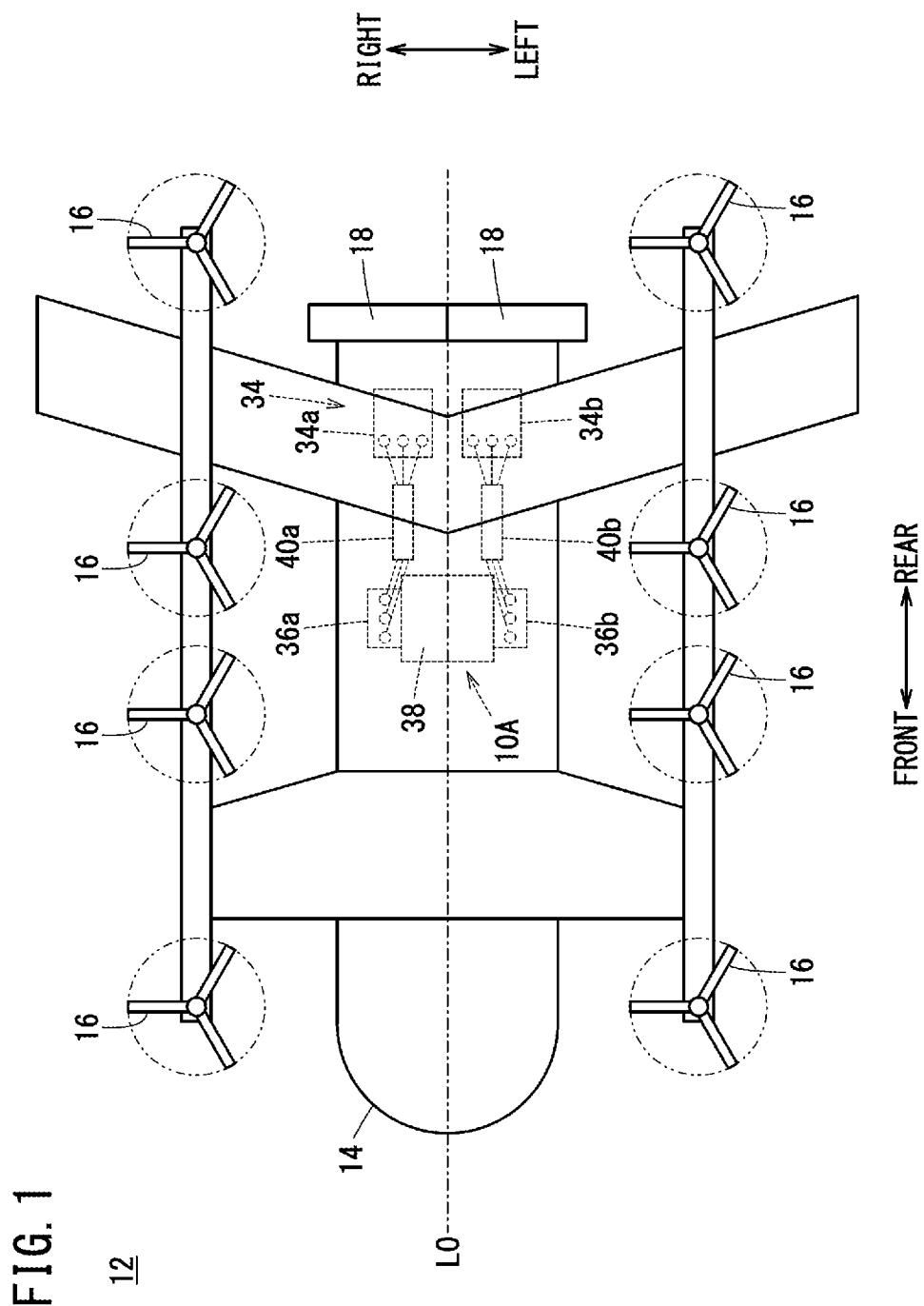
FIG. 1 is a schematic view of a moving object.

An electric power system 10A and a moving object 12 according to an embodiment of the present invention will be described below with reference to the drawings. As shown in FIG. 1, a moving object 12 according to the present embodiment is, for example, an aircraft (flying object). The aircraft is an electric vertical take-off and landing (eVTOL) aircraft, but is not limited thereto. For example, the moving object 12 may be a ship, a vehicle, or the like. The description hereinafter will be made in a case where the electric power system 10A is mounted on the moving object 12, although the present invention is not limited thereto.

The moving object 12 includes a fuselage 14. The front-rear direction of the fuselage 14 and the left-right direction of the fuselage 14 are orthogonal to each other. The front-rear direction of the fuselage 14 corresponds to a first direction herein. The left-right direction of the fuselage 14 corresponds to a second direction herein. The up-down direction of the fuselage 14 corresponds to a third direction herein.

The moving object 12 has eight VTOL rotors 16. The VTOL rotors 16 generate a thrust with respect to the fuselage 14, in the upward direction. The moving object 12 has two cruise rotors 18. The cruise rotors 18 generate a thrust with respect to the fuselage 14, in the forward direction of the fuselage 14.

Figure 2:
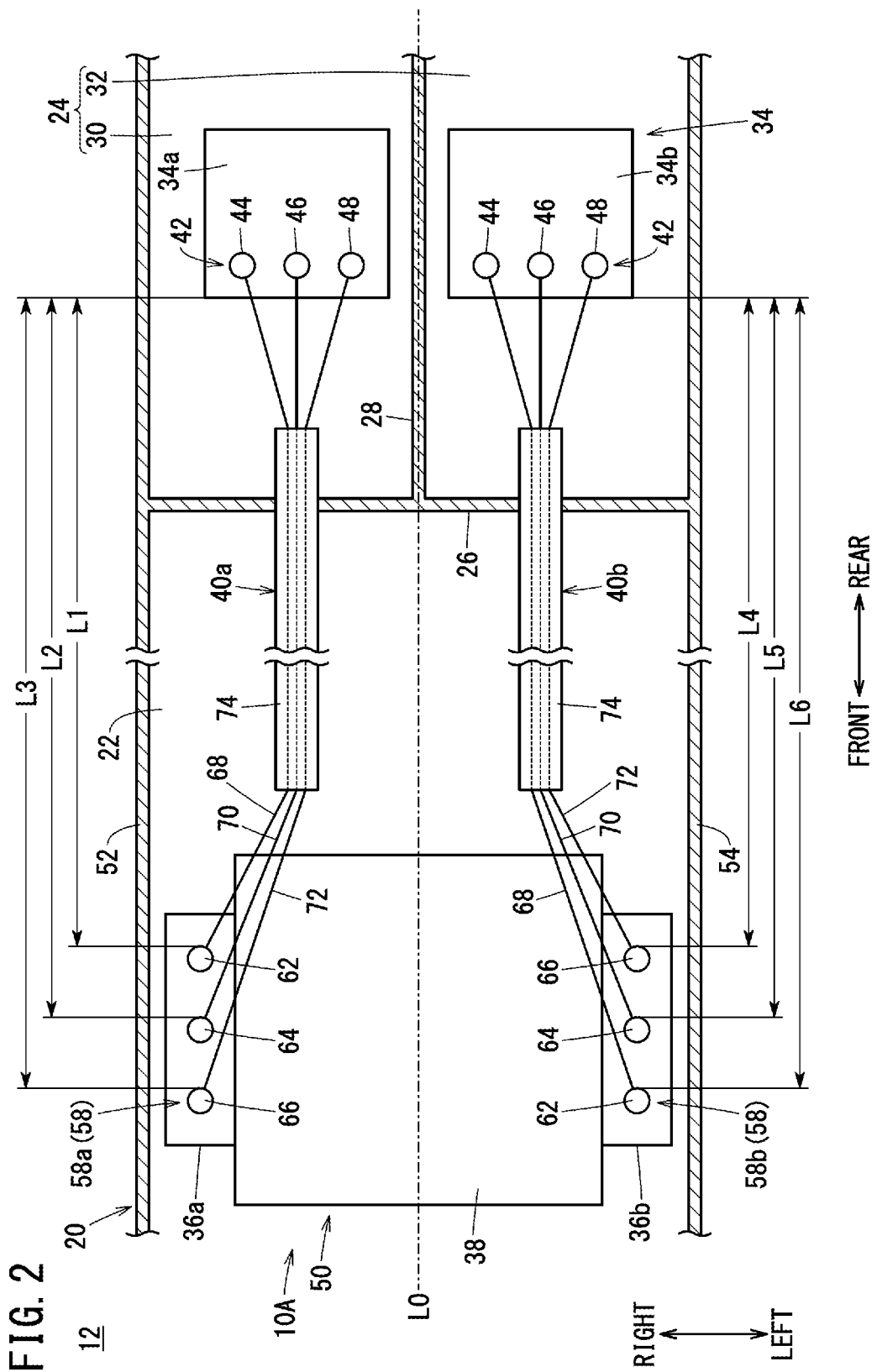
FIG. 2 is a plan view schematically showing an electric power system.

The moving object 12 includes the electric power system 10A. The electric power system 10A is disposed in the fuselage 14. As shown in FIG. 2, the fuselage 14 includes a system placement section 20 rearward of a cabin (not shown), in the front-rear direction of the fuselage 14. The system placement section 20 includes a first housing chamber 22 and a second housing chamber 24.

The first housing chamber 22 and the second housing chamber 24 are aligned along the front-rear direction of the fuselage 14. The first housing chamber 22 is positioned in the front direction of the fuselage 14 than the second housing chamber 24. A partition wall 26 is provided between the first housing chamber 22 and the second housing chamber 24. The second housing chamber 24 is divided into a first sub-chamber 30 and a second sub-chamber 32 by a partition wall 28. The first sub-chamber 30 and the second sub-chamber 32 are arranged in the left-right direction of the fuselage 14. The partition wall 28 extends on a center line L0 in the left-right direction of the fuselage 14.

The electric power system 10A includes a first polyphase rotating electric machine 34a, a second polyphase rotating electric machine 34b, a first power control unit (first power conversion device) 36a, a second power control unit (second power conversion device) 36b, and a main junction box 38. Hereinafter, the first power control unit 36a may be referred to as a first PCU 36a, and the second power control unit 36b may be referred to as a second PCU 36b. The main junction box 38 may be referred to as an MJB 38.

The first polyphase rotating electric machine 34a is a three-phase alternating current rotating electric machine. A first engine (not shown) is connected to the first polyphase rotating electric machine 34a. The first engine is, for example, a gas turbine engine, but is not limited thereto. The first polyphase rotating electric machine 34a functions as an electric power generator that generates electric power by being driven by the first engine. The first polyphase rotating electric machine 34a can also function as a motor for driving a compressor of the first engine.

The first PCU 36a and the first polyphase rotating electric machine 34a are electrically connected by a first polyphase cable 40a. The first PCU 36a is a first power conversion device that converts a three-phase alternating current transmitted from the first polyphase rotating electric machine 34a via the first polyphase cable 40a into a direct current. The electric power converted into the direct current by the first PCU 36a is supplied to the MJB 38. For example, a battery (not shown) is electrically connected to the MJB 38. Further, load devices such as the VTOL rotors 16, the cruise rotors 18, and the like are electrically connected to the MJB 38.

A second engine (not shown) is connected to the second polyphase rotating electric machine 34b. The second engine may have the same configuration as the first engine. The second polyphase rotating electric machine 34b functions as an electric power generator that generates electric power by being driven by the second engine. The second polyphase rotating electric machine 34b can also function as a motor for driving a compressor of the second engine.

The second PCU 36b and the second polyphase rotating electric machine 34b are electrically connected by a second polyphase cable 40b. The second PCU 36b is a second power conversion device that converts three-phase alternating current transmitted from the second polyphase rotating electric machine 34b via the second polyphase cable 40b into direct current. The electric power converted into the direct current by the second PCU 36b is supplied to the MJB 38.

The first polyphase rotating electric machine 34a is disposed in the first sub-chamber 30. The second polyphase rotating electric machine 34b is disposed in the second sub-chamber 32. The first polyphase rotating electric machine 34a and the second polyphase rotating electric machine 34b are positioned close to the partition wall 28. The partition wall 28 is interposed between the first polyphase rotating electric machine 34a and the second polyphase rotating electric machine 34b in the left-right direction of the fuselage 14. The first polyphase rotating electric machine 34a and the second polyphase rotating electric machine 34b are electrically separated from each other by the partition wall 28.

The first polyphase rotating electric machine 34a includes a three-phase power terminal unit 42. The power terminal unit 42 includes a first phase power terminal 44, a second phase power terminal 46, and a third phase power terminal 48. The first phase power terminal 44, the second phase power terminal 46, and the third phase power terminal 48 are in alignment with each other along the left-right direction (second direction) of the fuselage 14. The first phase power terminal 44, the second phase power terminal 46, and the third phase power terminal 48 are arranged in this order leftward in the left-right direction of the fuselage 14.

The second polyphase rotating electric machine 34b has the same configuration as the first polyphase rotating electric machine 34a. This can reduce the number of types of components of the electric power system 10A, and thus can reduce the manufacturing cost of the electric power system 10A. In the second polyphase rotating electric machine 34b, the same constituent elements as those of the first polyphase rotating electric machine 34a are denoted using the same numerals, and the detailed description of the configuration will be omitted.

The first PCU 36a and the second PCU 36b are disposed in the first housing chamber 22. The first PCU 36a and the second PCU 36b are disposed on both sides of a region 50 positioned forward of the rotating electric machine unit 34 including the first polyphase rotating electric machine 34a and the second polyphase rotating electric machine 34b, in the front-rear direction of the fuselage 14. The first PCU 36a and the second PCU 36b are spaced apart from each other in the left-right direction (second direction).

The first PCU 36a is positioned forward of the first polyphase rotating electric machine 34a and rightward of the second polyphase rotating electric machine 34b in the front-rear direction and the left-right direction of the fuselage 14. In other words, the first PCU 36a is positioned on the right side of the center line L0 of the fuselage 14. The first PCU 36a is adjacent to a right sidewall 52 of the fuselage 14.

The second PCU 36b is positioned forward of the second polyphase rotating electric machine 34b and leftward of the first polyphase rotating electric machine 34a in the front-rear direction and the left-right direction of the fuselage 14. In other words, the second PCU 36b is positioned on the left side of the center line L0 of the fuselage 14. The second PCU 36b is adjacent to a left sidewall 54 of the fuselage 14.

Figure 5:
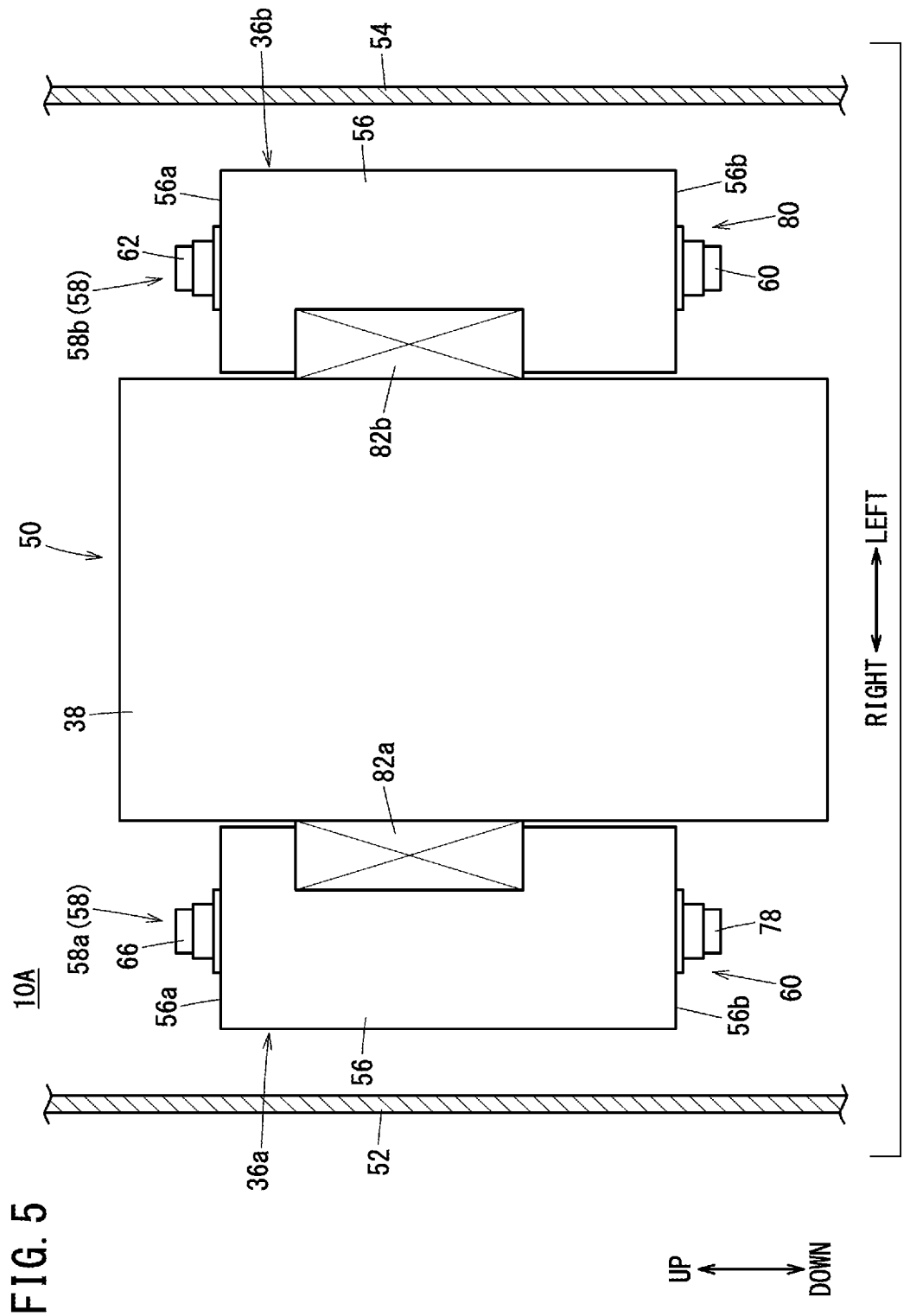
FIG. 5 is a front view schematically showing the electric power system.
Figure 6:
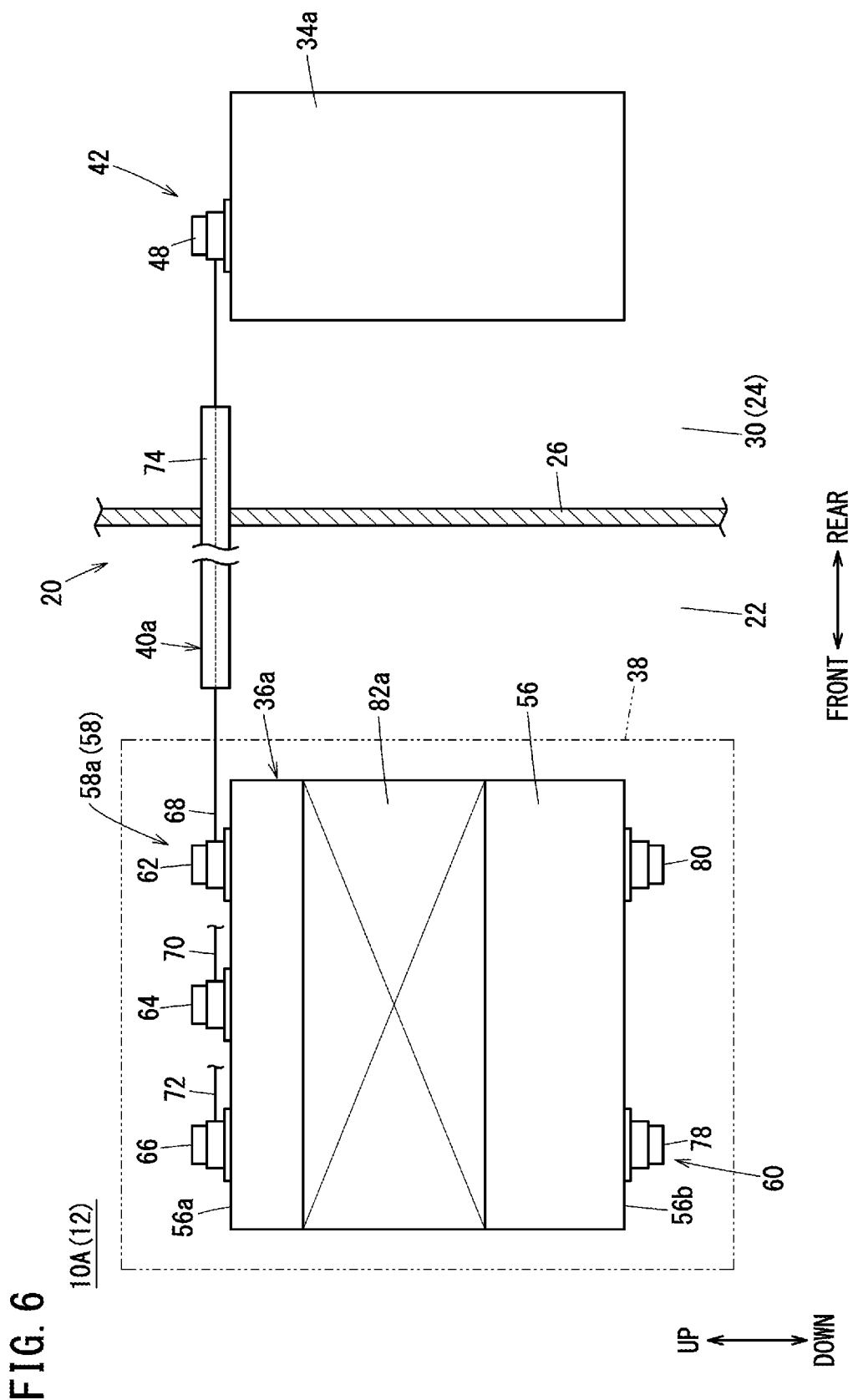
FIG. 6 is a side view schematically showing the electric power system.

As shown in FIGS. 5 and 6, the first PCU 36a includes a housing 56, a polyphase terminal unit 58, and a DC terminal unit 60. The housing 56 is formed in a rectangular parallelepiped shape. The polyphase terminal unit 58 is provided on the upper surface 56a of the housing 56. The DC terminal unit 60 is provided on the lower surface 56b of the housing 56.

Figure 3:
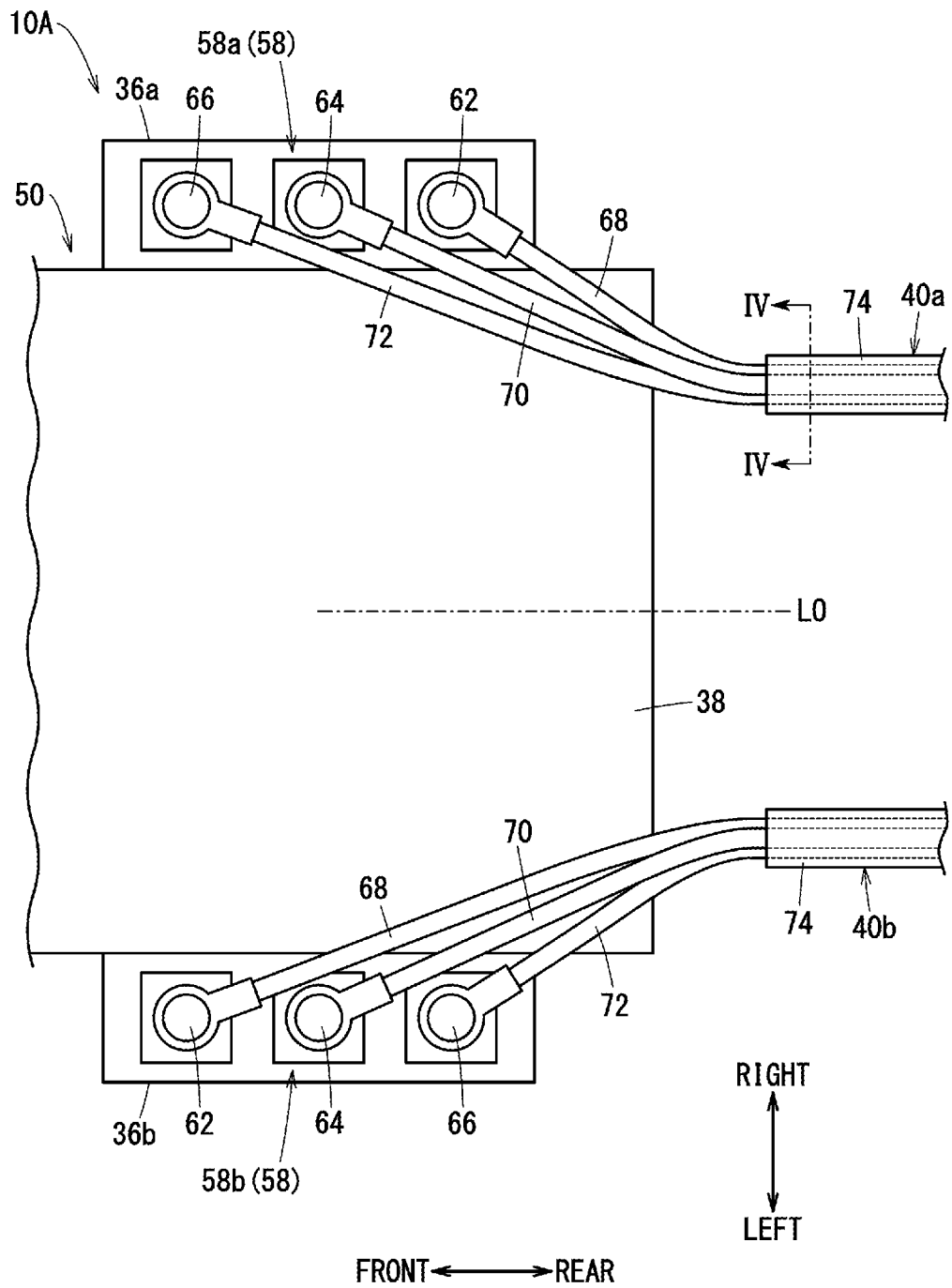
FIG. 3 is a plan view, with partial omission, of the electric power system.

As shown in FIGS. 2, 3 and 6, the polyphase terminal unit 58 includes a first phase terminal 62, a second phase terminal 64 and a third phase terminal 66. The first phase terminal 62, the second phase terminal 64, and the third phase terminal 66 are spaced apart from each other. The first phase terminal 62, the second phase terminal 64, and the third phase terminal 66 are aligned at intervals along the front-rear direction (first direction) of the fuselage 14.

In the first polyphase terminal unit 58a, which is the polyphase terminal unit 58 of the first PCU 36a, the first phase terminal 62, the second phase terminal 64, and the third phase terminal 66 are aligned in this order forward in the front-rear direction of the fuselage 14. In the first polyphase terminal unit 58a, the second phase terminal 64 is positioned forward of the first phase terminal 62, and the third phase terminal 66 is positioned forward of the second phase terminal 64, in the front-rear direction of the fuselage 14.

As shown in FIG. 2, a first distance L1, which is the shortest distance from the first phase terminal 62 of the first polyphase terminal unit 58a to the first polyphase rotating electric machine 34a, is smaller than a second distance L2, which is the shortest distance from the second phase terminal 64 of the first polyphase terminal unit 58a to the first polyphase rotating electric machine 34a. The second distance L2 is smaller than a third distance L3, which is the shortest distance from the third phase terminal 66 of the first polyphase terminal unit 58a to the first polyphase rotating electric machine 34a. The first polyphase terminal unit 58a and the power terminal unit 42 of the first polyphase rotating electric machine 34a are positioned at substantially the same level in the up-down direction of the fuselage 14 (see FIG. 6).

Figure 4:
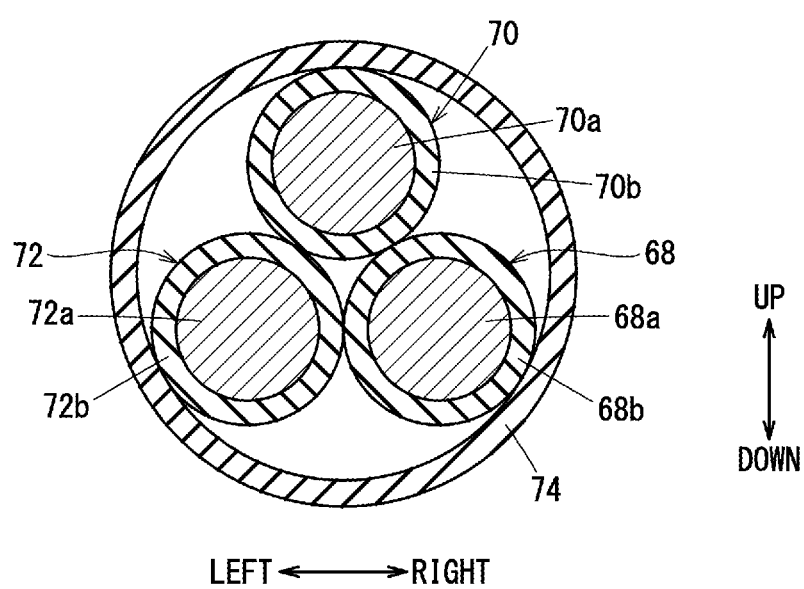
FIG. 4 is a cross-sectional view taken along line IV-IV of FIG. 3.

As shown in FIG. 4, the first polyphase cable 40a includes a first phase wire (first phase wiring) 68, a second phase wire (second phase wiring) 70, a third phase wire (third phase wiring) 72, and a sheath member 74. The first phase wire 68 includes a first phase conductor 68a and an insulating covering 68b for the first phase conductor 68a. The second phase wire 70 includes a second phase conductor 70a and an insulating covering 70b for the second phase conductor 70a. The third phase wire 72 includes a third phase conductor 72a and an insulating covering 72b for the third phase conductor 72a.

As shown in FIG. 2, the first phase wire 68 connects the first phase power terminal 44 and the first phase terminal 62 to each other. The second phase wire 70 connects the second phase power terminal 46 and the second phase terminal 64 to each other. The third phase wire 72 connects the third phase power terminal 48 and the third phase terminal 66 to each other. The sheath member 74 is a tubular member for bundling the first phase wire 68, the second phase wire 70, and the third phase wire 72 together. The sheath member 74 penetrates the partition wall 26.

In the first polyphase rotating electric machine 34a, the first phase power terminal 44, the second phase power terminal 46, and the third phase power terminal 48 are arranged in this order from the right side to the left side of the fuselage 14. Therefore, in the first polyphase cable 40a, the first phase wire 68, the second phase wire 70, and the third phase wire 72 are arranged in this order from the right side to the left side of the fuselage 14. The first distance L1 is smaller than the second distance L2, and the second distance L2 is smaller than the third distance L3. Thus, in the first polyphase cable 40a, the first phase wire 68, the second phase wire 70 and the third phase wire 72 do not need to be three-dimensionally crossed.

In the first polyphase terminal unit 58a, the first phase terminal 62, the second phase terminal 64, and the third phase terminal 66 are not necessarily in alignment with each other and may be deviated in the left-right direction of the fuselage 14 as long as the first phase wire 68, the second phase wire 70, and the third phase wire 72 do not need to be three-dimensionally crossed.

As shown in FIG. 6, the DC terminal unit 60 includes a positive terminal 78 and a negative terminal 80. The positive terminal 78 and the negative terminal 80 are arranged in the front-rear direction (first direction) of the fuselage 14 with a space therebetween. The positive terminal 78 and the negative terminal 80 are electrically connected to a lower part of the MJB 38 via cables or the like (not shown). To an upper part of the MJB 38, the battery and the load devices are electrically connected via cables (not shown). That is, the electric power converted into a direct current by the first PCU 36a is supplied to the MJB 38 from the lower part thereof through the positive terminal 78 and the negative terminal 80, and then provided to the battery and the load devices from the upper part of the MJB 38.

As shown in FIGS. 2, 3, 5, and 7, the second PCU 36b has the same configuration as the first PCU 36a. This can reduce the number of types of components of the electric power system 10A, and thus can reduce the cost of the electric power system 10A. In the second PCU 36b, the same constituent elements as those of the first PCU 36a are denoted using the same numerals, and the detailed description thereof will be omitted.

As shown in FIGS. 2 and 3, the second PCU 36b has a configuration in which the first PCU 36a turns 180° in the front-rear direction of the fuselage 14.

Figure 7:
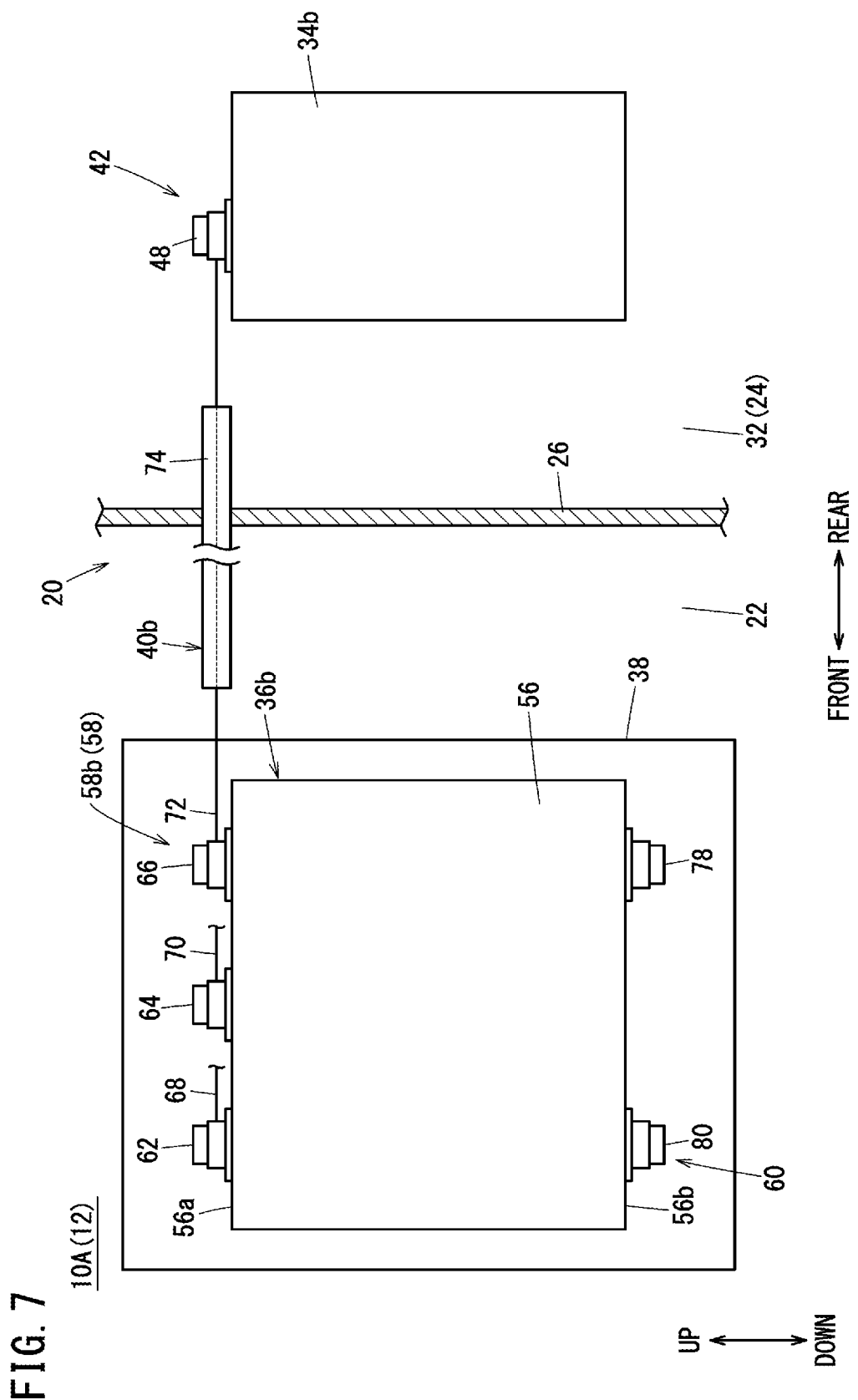
FIG. 7 is a side view schematically showing the electric power system.

As shown in FIGS. 2, 3 and 7, in the second polyphase terminal unit 58b, which is the polyphase terminal unit 58 of the second PCU 36b, the first phase terminal 62, the second phase terminal 64, and the third phase terminal 66 are arranged in this order rearward in the front-rear direction of the fuselage 14. In the second polyphase terminal unit 58b, the second phase terminal 64 is positioned forward of the third phase terminal 66, and the first phase terminal 62 is positioned forward of the second phase terminal 64, in the front-rear direction of the fuselage 14. The order of the terminals of the second polyphase terminal unit 58b is opposite to the order of the terminals of the first polyphase terminal unit 58a.

As shown in FIG. 2, a fourth distance L4, which is the shortest distance from the third phase terminal 66 of the second polyphase terminal unit 58b to the second polyphase rotating electric machine 34b, is smaller than a fifth distance L5, which is the shortest distance from the second phase terminal 64 of the second polyphase terminal unit 58b to the second polyphase rotating electric machine 34b. The fifth distance L5 is smaller than a sixth distance L6, which is the shortest distance from the first phase terminal 62 of the second polyphase terminal unit 58b to the second polyphase rotating electric machine 34b.

The second polyphase cable 40b has the same configuration as the first polyphase cable 40a. The sheath member 74 of the second polyphase cable 40b penetrates the partition wall 26.

In the second polyphase rotating electric machine 34b, the first phase power terminal 44, the second phase power terminal 46, and the third phase power terminal 48 are arranged in this order leftward in the left-right direction of the fuselage 14. Therefore, in the second polyphase cable 40b, the first phase wire 68, the second phase wire 70, and the third phase wire 72 are arranged in this order leftward in the left-right direction of the fuselage 14. In the second polyphase terminal unit 58b, the first phase wire 68, the second phase wire 70 and the third phase wire 72 are arranged such that the fourth distance L4 is smaller than the fifth distance L5, and the fifth distance L5 is smaller than the sixth distance L6. Thus, in the second polyphase cable 40b, the first phase wire 68, the second phase wire 70 and the third phase wire 72 do not need to be three-dimensionally crossed.

In the second polyphase terminal unit 58b, the first phase terminal 62, the second phase terminal 64, and the third phase terminal 66 are not necessarily in alignment with each other and may be deviated in the left-right direction of the fuselage 14 as long as the first phase wire 68, the second phase wire 70, and the third phase wire 72 do not need to be three-dimensionally crossed.

As shown in FIGS. 6 and 7, the positions of the positive terminal 78 and the negative terminal 80 in the second PCU 36b are inverted from those in the first PCU 36a, in the front-rear direction of the fuselage 14.

As shown in FIGS. 2, 3, and 5, the MJB 38 is disposed in the region 50 between the first PCU 36a and the second PCU 36b. The center line of the MJB 38 is positioned on the center line L0 of the fuselage 14, in the left-right direction of the fuselage 14. The first PCU 36a is attached to the right side surface of the MJB 38. The second PCU 36b is attached to the left side surface of the MJB 38.

As shown in FIG. 5, a first cooling unit 82a is provided between the MJB 38 and the first PCU 36a. A second cooling unit 82b is provided between the MJB 38 and the second PCU 36b. Cooling water is running through the first cooling unit 82a and the second cooling unit 82b. The first PCU 36a and the second PCU 36b each have an internal switching element, and heat is generated from the switching element and the like. The first PCU 36a is cooled by the first cooling unit 82a. The second PCU 36b is cooled by the second cooling unit 82b.

As described above, according to the present embodiment, the three-phase wires of the first polyphase cable 40a do not need to be three-dimensionally crossed, and the three-phase wires of the second polyphase cable 40b do not need to be three-dimensionally crossed. Therefore, even when relatively thick conductor wires are used as the three-phase wires of the first polyphase cable 40a and the second polyphase cable 40b, the wiring can be performed as desired. Moreover, since the first PCU 36a and the second PCU 36b having the same configuration may be arranged in such a manner that the second PCU 36b is simply turned 180° to face the first PCU 36a, the cost of the electric power system 10A can be suppressed.

Modifications

Next, a description will be given concerning the advantageous effects of an electric power system 10B. In the present modification, the same constituent elements as those described in the aforementioned electric power system 10A are denoted using the same reference numerals, and detailed description of such features will be omitted.

Figure 8:
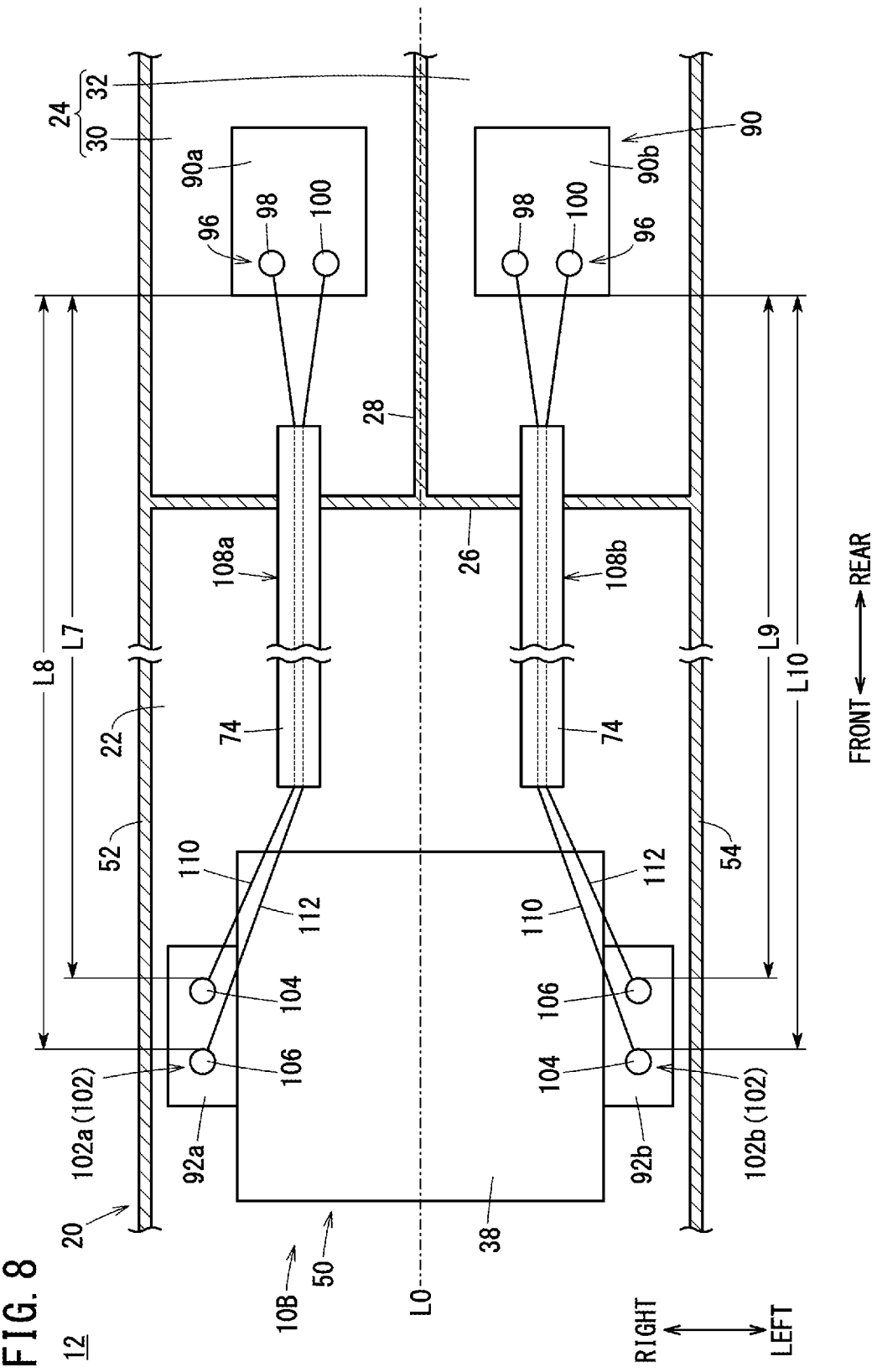
FIG. 8 is a plan view schematically showing an electric power system according to a modification.

As shown in FIG. 8, the electric power system 10B includes a first rotating electric machine 90a, a second rotating electric machine 90b, a first PCU 92a, a second PCU 92b, and a MJB 38. The first rotating electric machine 90a is configured similarly to the first polyphase rotating electric machine 34a described above, except that it is, for example, a single-phase alternating current rotating electric machine. The second rotating electric machine 90b has the same configuration as the first rotating electric machine 90a. A power terminal unit 96 of each of the first rotating electric machine 90a and the second rotating electric machine 90b includes a grounding power terminal 98 and an ungrounded power terminal 100.

The first PCU 92a and the second PCU 92b are disposed on both sides of a region 50 positioned forward of a rotating electric machine unit 90 including the first rotating electric machine 90a and the second rotating electric machine 90b, in the front-rear direction of the fuselage 14. The first PCU 92a is configured similarly to the first PCU 36a described above, except that terminal units 102 are provided instead of the polyphase terminal unit 58. The first terminal unit 102a, which is the terminal unit 102 of the first PCU 92a, includes a grounding terminal 104 and an ungrounded terminal 106.

A seventh distance L7, which is the shortest distance from the grounding terminal 104 of the first terminal unit 102a to the first rotating electric machine 90a, is smaller than an eighth distance L8, which is the shortest distance from the ungrounded terminal 106 of the first terminal unit 102a to the first rotating electric machine 90a. The first terminal unit 102a is electrically connected to the power terminal unit 96 of the first rotating electric machine 90a through a first power cable 108a.

The first power cable 108a includes a grounding wire 110, an ungrounded wire 112, and a sheath member 74. The grounding wire 110 includes a grounded conductor (not shown) and an insulating covering (not shown) covering the grounded conductor. The ungrounded wire 112 includes an ungrounded conductor (not shown) and an insulating covering (not shown) covering the ungrounded conductor. The grounding wire 110 connects the grounding power terminal 98 and the grounding terminal 104 to each other. The ungrounded wire 112 connects the ungrounded power terminal 100 and the ungrounded terminal 106 to each other.

The second PCU 92b has the same configuration as the first PCU 92a. The second PCU 92b has a configuration as the first PCU 92a is turned 180° in the front-rear direction of the fuselage 14. The second PCU 92b has a second terminal unit 102b as the terminal unit 102. The order of the terminals in the second terminal unit 102b are arranged in a direction opposite to the order of those in the first terminal unit 102a.

A ninth distance L9, which is the shortest distance from the ungrounded terminal 106 of the second terminal unit 102b to the second rotating electric machine 90b, is smaller than a tenth distance L10, which is the shortest distance from the grounding terminal 104 of the second terminal unit 102b to the second rotating electric machine 90b. The second terminal unit 102b is electrically connected to the power terminal unit 96 of the first rotating electric machine 90a through a second power cable 108*b*. The second power cable 108*b* is configured in the same manner as the first power cable 108*a*.

According to such a modification, a plurality of wires of the first power cable 108*a* do not need to be three-dimensionally crossed, and a plurality of wires of the second power cable 108*b* do not need to be three-dimensionally crossed. Therefore, even when relatively thick conductor wires are used as the wires of the first power cable 108*a* and the second power cable 108*b*, the wiring can be performed as desired. Moreover, since the first PCU 92*a* and the second PCU 92*b* having the same configuration are arranged simply by turning 180°, the cost of the electric power system 10B can be suppressed.

Figure 9:
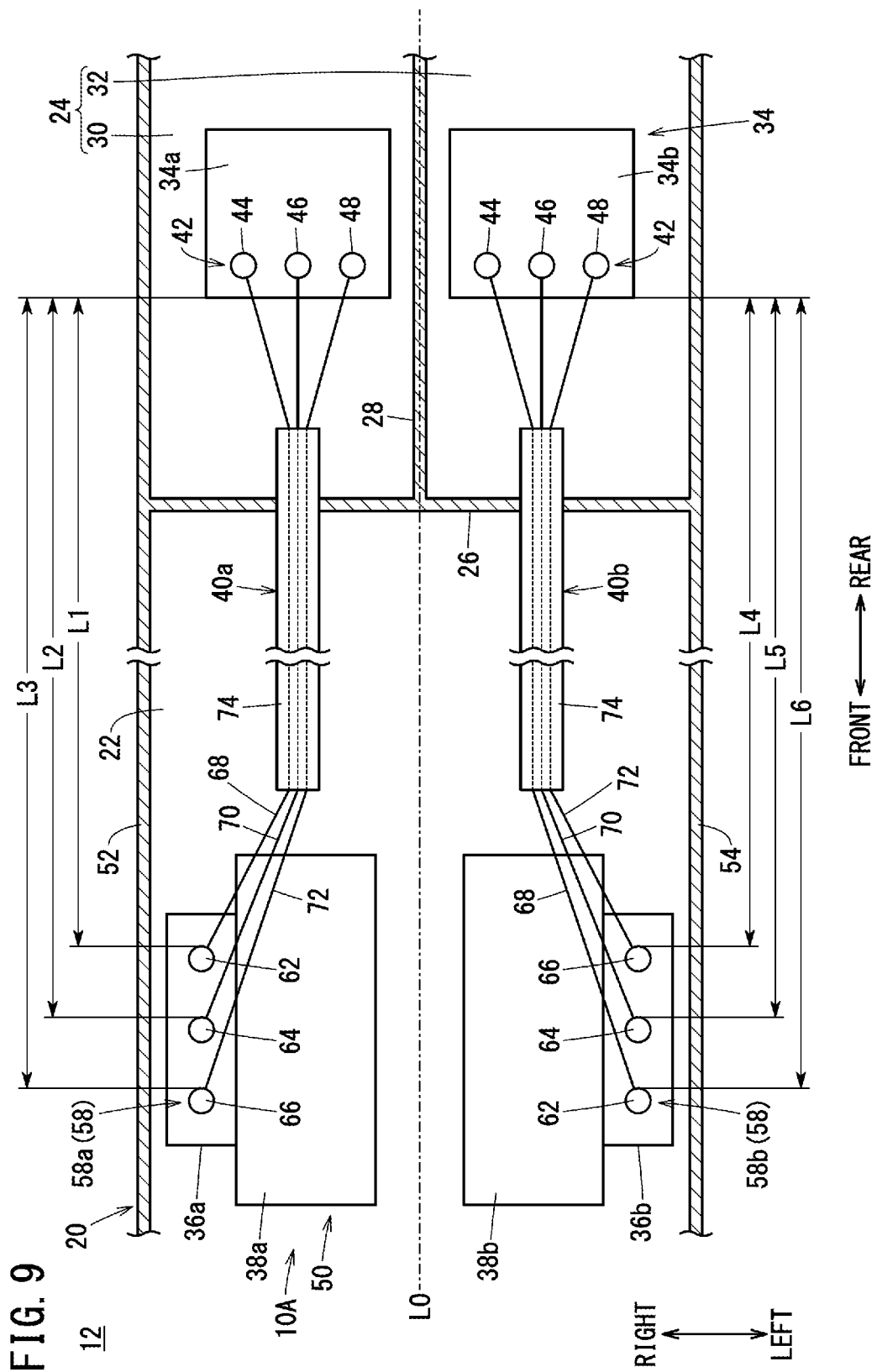
FIG. 9 is a plan view schematically showing a power system according to another modification.

The above-described electric power system 10A may include a first MJB 38*a* and a second MJB 38*b* instead of the MJB 38, as shown in FIG. 9. The first MJB 38*a* is electrically connected to the first PCU 36*a*. The second MJB 38*b* is electrically connected to the second PCU 36*b*. The casing of the first MJB 38*a* and the casing of the second MJB 38*b* are independent of each other. The first MJB 38*a* and the second MJB 38*b* are disposed in a state of being separated from each other in the left-right direction of the fuselage 14. Similarly, the electric power system 10B may include a first MJB 38*a* and a second MJB 38*b* instead of the MJB 38.

The present embodiment is not limited to the above-described configuration. The electric power system 10A may have a configuration suitable for a four-phase or more alternating current.

In addition to the above disclosure, the following Supplementary Notes are further disclosed.

Supplementary Note 1

The electric power system (10A) including: the rotating electric machine unit (34) including the first polyphase rotating electric machine (34*a*) and the second polyphase rotating electric machine (34*b*); the pair of the first polyphase terminal unit (58*a*) and the second polyphase terminal unit (58*b*) disposed on both sides of the region (50) positioned in the first direction relative to the rotating electric machine unit so as to be spaced from each other in a second direction intersecting the first direction; the first polyphase cable (40*a*) connecting the first polyphase terminal unit and the first polyphase rotating electric machine; and the second polyphase cable (40*b*) connecting the second polyphase terminal unit and the second polyphase rotating electric machine, wherein each of the first polyphase terminal unit and the second polyphase terminal unit includes the first phase terminal (62), the second phase terminal (64) and the third phase terminal (66) arranged along the first direction, the first distance (L1) from the first phase terminal of the first polyphase terminal unit to the first polyphase rotating electric machine is smaller than the second distance (L2) from the second phase terminal of the first polyphase terminal unit to the first polyphase rotating electric machine, the second distance is smaller than the third distance (L3) from the third phase terminal of the first polyphase terminal unit to the first polyphase rotating electric machine, the fourth distance (L4) from the third phase terminal of the second polyphase terminal unit to the second polyphase rotating electric machine is smaller than the fifth distance (L5) from the second phase terminal of the second polyphase terminal unit to the second polyphase rotating electric machine, and a fifth distance is smaller than the sixth distance (L6) from the first phase terminal of the second polyphase terminal unit to the second polyphase rotating electric machine.

According to such a configuration, since the pair of polyphase terminal units are disposed on both sides of the region positioned in the first direction relative to the rotating electric machine unit so as to be separated from each other in the second direction intersecting the first direction, the pair of polyphase terminal units can be electrically separated from each other. In addition, in the polyphase terminal unit, the first phase terminal, the second phase terminal, and the third phase terminal are arranged along the first direction, and thus the dimension of the electric power system in the second direction (the direction in which the pair of polyphase terminal units are arranged) can be relatively shortened.

Further, in such an electric power system, by applying the same structure to the connection between the first polyphase rotating electric machine and the first polyphase cable and between the second polyphase rotating electric machine and the second polyphase cable, the manufacturing cost of the electric power system can be suppressed. According to the above configuration, in the first polyphase terminal unit, the first distance is smaller than the second distance, and the second distance is smaller than the third distance. In the second polyphase terminal unit, the fourth distance is smaller than the fifth distance, and the fifth distance is smaller than the sixth distance. Therefore, even when the above-described connection structure is applied to the electric power system, it is not necessary to three-dimensionally cross the wires in each of the first polyphase cable and the second polyphase cable. Therefore, according to such a configuration, even when a relatively thick conductor wire is used for the polyphase wiring of the polyphase cables, the wiring can be performed as desired.

Supplementary Note 2

In the electric power system according to Supplementary Note 1, a power terminal unit (42) of the first polyphase rotating electric machine and the first polyphase terminal unit may be positioned at substantially the same level in a third direction intersecting the first direction and the second direction, and a power terminal unit of the second polyphase rotating electric machine and the second polyphase terminal unit may be positioned at substantially the same level in the third direction.

According to such a configuration, the power terminal unit of the first polyphase rotating electric machine and the first polyphase terminal unit are positioned at substantially the same level in the third direction, and thus the length of the first polyphase cable can be made relatively small. Further, the power terminal unit of the second polyphase rotating electric machine and the second polyphase terminal unit are positioned at substantially the same level in the third direction, and thus the length of the second polyphase cable can be made relatively small.

Supplementary Note 3

The power system according to Supplementary Note 1 or 2 may further include a pair of a first power conversion devices (36*a*) and a second power conversion device (36*b*) that are configured to convert an alternating current into a direct current, wherein the first power conversion device (36*a*) may be equipped with the first polyphase terminal unit, and the second power conversion device (36*b*) may be equipped with the second polyphase terminal unit.

Supplementary Note 4

The electric power system according to Supplementary Note 3 may further include a junction box (38) disposed in the region and electrically connected to the first power conversion device and the second power conversion device.

According to such a configuration, the junction box can prevent the first power conversion device and the second power conversion device from being electrically connected to each other while making the power system compact.

Supplementary Note 5

In the electric power system according to Supplementary Note 3 or 4, the first power conversion device and the second power conversion device may have the same configuration, and the second polyphase terminal unit of the second power conversion device may be arranged in a manner so that the first power conversion device is turned 180° in the first direction.

According to such a configuration, the first power conversion device and the second power conversion device have the same configuration, and thus the manufacturing cost of the power system can be further reduced.

Supplementary Note 6

The electric power system (10B) including: the rotating electric machine unit (90) including the first rotating electric machine (90a) and the second rotating electric machine (90b); the pair of the first terminal unit (102a) and the second terminal unit (102b) disposed on both sides of the region positioned in the first direction relative to the rotating electric machine unit so as to be spaced from each other in the second direction intersecting the first direction; the first cable (108a) connecting the first terminal unit and the first rotating electric machine; and the second cable (108b) connecting the second terminal unit and the second rotating electric machine, wherein each of the first terminal unit and the second terminal unit includes the grounding terminal (104) and the ungrounded terminal (106) arranged along the first direction, the distance (L7) from the grounding terminal of the first terminal unit to the first rotating electric machine is smaller than the distance (L8) from the ungrounded terminal of the first terminal unit to the first rotating electric machine, and the distance (L9) from the ungrounded terminal of the second terminal unit to the second rotating electric machine is smaller than the distance (L10) from the grounding terminal of the second terminal unit to the second rotating electric machine.

Supplementary Note 7

A moving object (12) includes the electric power system according to any one of Supplementary Notes 1 to 6.

According to such a configuration, it is possible to obtain a moving object in which wiring can be performed without three-dimensional crossing with a reduced manufacturing cost.

Moreover, it should be noted that the present invention is not limited to the embodiments described above, but a variety of configurations may be adopted therein without departing from the essence and gist of the present invention.

The invention claimed is:

1. An electric power system comprising:
   a rotating electric machine unit including a first polyphase rotating electric machine and a second polyphase rotating electric machine;
   a pair of a first polyphase terminal unit and a second polyphase terminal unit disposed on both sides of a region positioned in a first direction relative to the rotating electric machine unit so as to be spaced from each other in a second direction intersecting the first direction;
   a first polyphase cable connecting the first polyphase terminal unit and the first polyphase rotating electric machine; and
   a second polyphase cable connecting the second polyphase terminal unit and the second polyphase rotating electric machine, wherein
   each of the first polyphase terminal unit and the second polyphase terminal unit includes a first phase terminal, a second phase terminal and a third phase terminal arranged along the first direction,
   a first distance from the first phase terminal of the first polyphase terminal unit to the first polyphase rotating electric machine is smaller than a second distance from the second phase terminal of the first polyphase terminal unit to the first polyphase rotating electric machine,
   the second distance is smaller than a third distance from the third phase terminal of the first polyphase terminal unit to the first polyphase rotating electric machine,
   a fourth distance from the third phase terminal of the second polyphase terminal unit to the second polyphase rotating electric machine is smaller than a fifth distance from the second phase terminal of the second polyphase terminal unit to the second polyphase rotating electric machine, and
   the fifth distance is smaller than a sixth distance from the first phase terminal of the second polyphase terminal unit to the second polyphase rotating electric machine.

2. The electric power system according to claim 1, wherein
   a power terminal unit of the first polyphase rotating electric machine and the first polyphase terminal unit are positioned at substantially a same level in a third direction intersecting the first direction and the second direction, and
   a power terminal unit of the second polyphase rotating electric machine and the second polyphase terminal unit are positioned at substantially a same level in the third direction.

3. The electric power system according to claim 1, further comprising:
   a pair of a first power conversion device and a second power conversion device that are configured to convert an alternating current into a direct current,
   wherein the first power conversion device is equipped with the first polyphase terminal unit, and
   the second power conversion device is equipped with the second polyphase terminal unit.

4. The electric power system according to claim 3, further comprising:
   a junction box disposed in the region and electrically connected to the first power conversion device and the second power conversion device.

5. The electric power system according to claim 3, wherein
   the first power conversion device and the second power conversion device have a same configuration, and
   the second polyphase terminal unit of the second power conversion device is arranged in a manner so that the first polyphase terminal unit of the first power conversion device is turned 180° in the first direction.

6. A moving object comprising the electric power system according to claim 1.

7. An electric power system comprising:
   a rotating electric machine unit including a first rotating electric machine and a second rotating electric machine;
   a pair of a first terminal unit and a second terminal unit disposed on both sides of a region positioned in a first direction relative to the rotating electric machine unit so as to be spaced from each other in a second direction intersecting the first direction;
   a first cable connecting the first terminal unit and the first rotating electric machine; and a second cable connecting the second terminal unit and the second rotating electric machine, wherein each of the first terminal unit and the second terminal unit includes a grounding terminal and an ungrounded terminal arranged along the first direction, a distance from the grounding terminal of the first terminal unit to the first rotating electric machine is smaller than a distance from the ungrounded terminal of the first terminal unit to the first rotating electric machine, and a distance from the ungrounded terminal of the second terminal unit to the second rotating electric machine is smaller than a distance from the grounding terminal of the second terminal unit to the second rotating electric machine.

* * * * *